Figure 1:
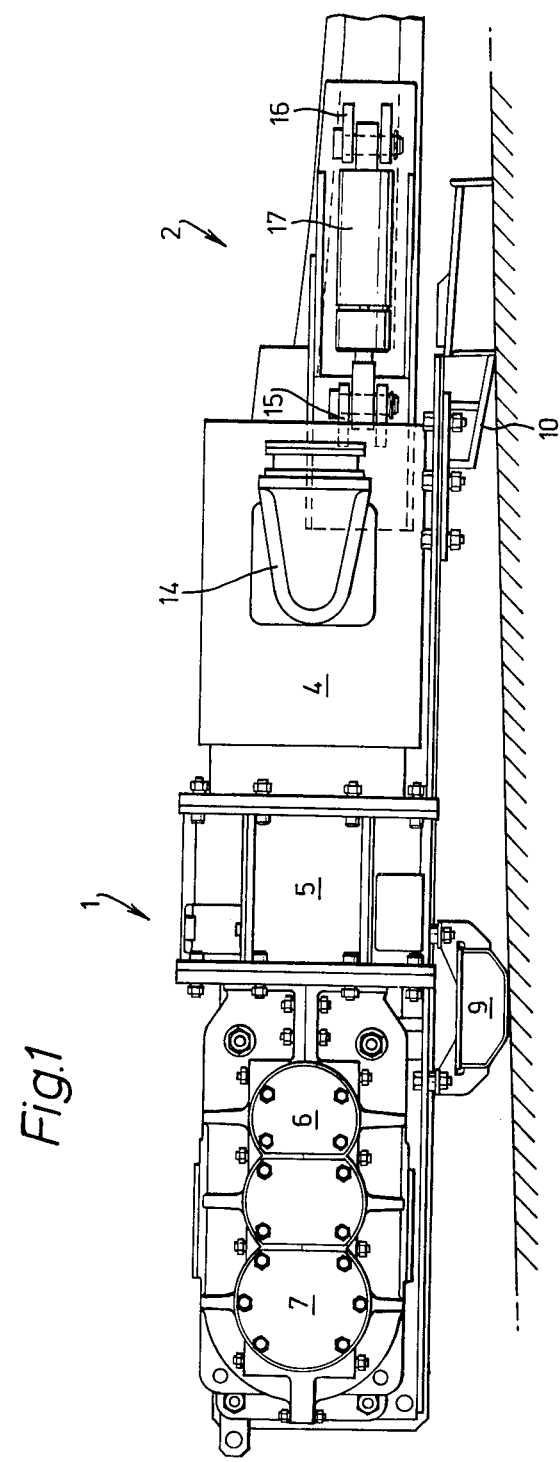

United States Patent [19]

Hartley et al.

[11] 4,245,739
[45] Jan. 20, 1981

[54] APPARATUS FOR CONTROLLING A CONVEYOR DRIVE UPON CONVEYOR CHAIN BREAKAGE

[75] Inventors: Dennis Hartley, Burton-on-Trent; Peter Phillips, Ashby-de-la-Zouch, both of England

[73] Assignee: Coal Industry (Patents) Limited, London, England

[21] Appl. No.: 937,478

[22] Filed: Aug. 28, 1978

[30] Foreign Application Priority Data

Sep. 9, 1977 [GB] United Kingdom .............. 37710/77

[51] Int. Cl.³ ............................................. B65G 43/00
[52] U.S. Cl. ....................................... 198/856; 91/433
[58] Field of Search ............... 198/856, 323, 468, 301, 198/502, 571, 718; 226/11; 74/242.9; 91/433, 318, 431

[56] References Cited

U.S. PATENT DOCUMENTS 2,962,149 11/1960 Hansen ................................. 198/323
3,688,557 9/1972 Marinus ........................... 198/502 X
3,897,640 8/1975 Swisher et al. .................. 198/301 X

FOREIGN PATENT DOCUMENTS 678454 9/1952 United Kingdom ...................... 198/813
793229 4/1958 United Kingdom ...................... 198/813
820982 9/1959 United Kingdom ...................... 198/833
845890 8/1960 United Kingdom ....................... 91/433
998168 7/1965 United Kingdom .................... 74/242.9

Primary Examiner—Robert B. Reeves
Assistant Examiner—Douglas D. Watts
Attorney, Agent, or Firm—Stevens, Davis, Miller & Mosher

[57] ABSTRACT

A conveyor arrangement wherein difficulties associated with breakage of a conveyor chain are overcome by providing hydraulic rams mounted between conveyor parts which are urged together in operation. The pressure in the hydraulic rams is monitored and when the chain breaks, the change in pressure or hydraulic ram extension is detected by switches which switch off the conveyor motor. A computer means is notified of the monitored pressure of the hydraulic ram.

7 Claims, 2 Drawing Figures

APPARATUS FOR CONTROLLING A CONVEYOR DRIVE UPON CONVEYOR CHAIN BREAKAGE

The present invention relates to conveyor arrangements particularly, but not exclusively to those employing computer controlled chain conveyors.

Hitherto, a problem which has occurred with chain driven conveyors, for example, armoured face conveyors in coal mines, is that the chain may break and unless a controlling computer or operator is informed the conveyor motor continues running. If this happens, conveyor chain can pile up under the conveyor rendering subsequent repair extremely difficult.

An object of the present invention is to provide an improved conveyor arrangement which tends to overcome the above mentioned problem. It is a further object of the invention to provide a conveyor arrangement which is compatible with computer controlled automated installations.

According to the present invention, a conveyor arrangement comprises a drive motor, at least two conveyor parts which in use are urged towards each other and control means for the conveyor including sensing means connected to two of the conveyor parts for sensing the urging force on the two parts, which sensing means derives signals indicative of the sensed urging force.

Preferably, the control means derives a first signal if the signals indicative of sensed urging force falls below a preselected value.

The sensing means conveniently comprises an hydraulic ram. The control means derives a second signal if the piston of the ram exceeds a preselected travel during operation.

Advantageously, the first indication signal and the second indication signal switch off the drive motor.

The control means comprises a computer means including a monitor which monitors the signals indicative of the sensed urging force.

The monitor notifies the computer means if the signals fall outside their normal operating range.

The computer means derives a warning signal if the signals indicative of the sensed urging force are too high.

Figure 2:
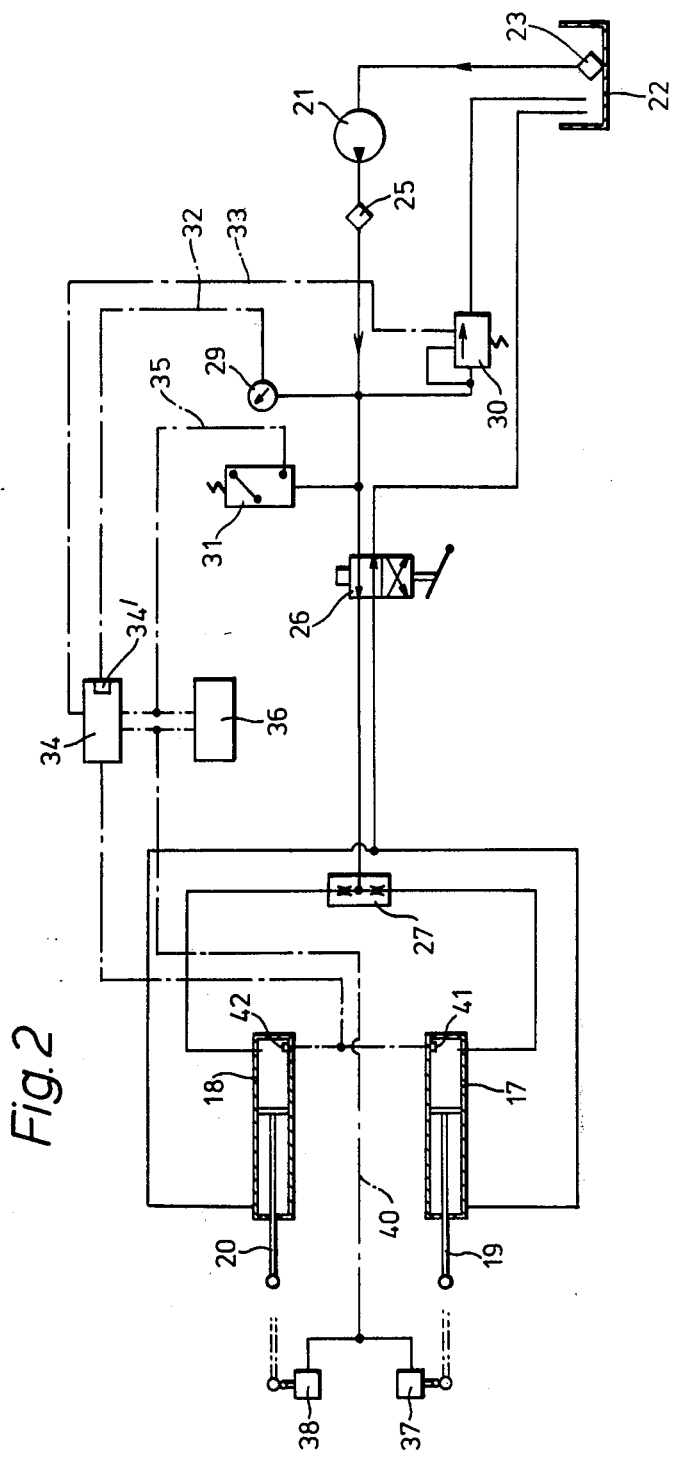

An embodiment of the invention will now be described by way of example only with reference to the accompanying drawings in which:

FIG. 1 is a side elevation of part of a conveyor, and
FIG. 2 is a circuit diagram of a conveyor arrangement.

In an underground coal mine, coal is won from a coal seam by a mining machine which traverses to and fro along an armoured face conveyor arranged adjacent to the coal face. The armoured face conveyor transports coal to an end of the coal face at a junction with a mine roadway, commonly referred to in the art as the main gate. The other end of the conveyor is at the other side of the coal face, commonly referred to as the tail gate.

FIG. 1 shows part of a conveyor which part is located at the tail gate. The conveyor part comprises a head frame generally indicated by 1 and a ramp pan generally indicated by 2. A plurality of conveyor pans (not shown) extends beyond the ramp pan 2 along the coal face.

The head frame 1 comprises an electric motor 4, a fluid coupling 5 and a gearbox 6. A drive sprocket is not shown, but is in a position indicated at 7. The head frame 1 is mounted upon skids 9 and 10.

A power supply bracket for the motor 4 is indicated at 14 and in use a cable (not shown) is connected to the bracket. The motor 4 drivably engages the sprocket at 7 via the fluid coupling 5 and gearbox 6. The sprocket drivably engages a chain (not shown), and the chain pulls flight bars (not shown) along the armoured face conveyor to effect transport of won coal therealong.

A bracket 15 is fixedly secured to the headframe 1 and a similar bracket 16 is fixedly secured to the ramp pan 2. The brackets 15 and 16 are interconnected by an hydraulic ram 17. A further similar hydraulic ram is secured to similar brackets on the other side of the conveyor. The further ram is not shown in FIG. 1, but is indicated at 18 in FIG. 2.

Referring now to FIG. 2, an hydraulic power pack is indicated at 21. The power pack is fed from a tank 22 via a filter 23. the power pack 21 is connected to the rams 17 and 18 via a further filter 25, a manual control valve 26 and a pressure equalizer 27. The pressure equalizer comprises two pressure restrictors. The rams 17 and 18 are connected back to tank via the control valve 26. Pistons 19 and 20 are provided for rams 17 and 18 respectively.

The supply line between the further filter 25 and the control valve 26 is tapped to operate three further devices, these being a pressure monitor 29, an excess pressure relief valve 30 and a low pressure operated switch 31.

The pressure monitor 29 is adapted to derive an electrical signal indicative of the monitored pressure and this electrical signal is fed to computer control means 34 including a monitor 34', via an electrical line 32.

The relief valve 30 is connected to tank and if the pressure in the line from the power pack exceeds a preselected amount, then a pilot operated spool in the valve 30 causes said power pack line to be connected to the tank. The relief valve 30 is connected to computer means 34 via an electrical line 33.

The switch 31 is actuated if the pressure in the line from the power pack falls below a preselected level. An electrical line 35 from the switch 31 is connected to the computer control means 34 so that the latter is notified of the low pressure. The line 35 is also connected to the pilot line 36 of the motor 4, so that the latter is turned off when the pressure falls below the preselected value.

The rams 17 and 18 co-operate with limit switches 37 and 38, respectively, such that when the stroke of ram pistons 19 and 20 reaches an outer most extremity of their travel, the switches are actuated. The pistons are shown dotted in their extreme travel position.

The switches 37 and 38 are connected via an electrical line 40 to the computer means 34 and to the pilot line 36 of the motor 4. The motor 4 is switched off when the switches 37 and 38 are actuated.

Further switches 41 and 42 co-operate with the ram 17 and 18 respectively such that when the pistons 19 and 20 reach the innermost extremity of their travel, the switches are actuated. The switches 41 and 42 are connected to the computer means 34 so that the latter is notified when the pistons reach said opposite extremity.

In operation described with reference to both the Figures the armoured face conveyor conveys coal to the main gate as previously described. The conveyor chain is tensioned and this tension causes the head frame 1 and the ramp pan 2 to be urged together against the rams 17 and 18. The hydraulic pressure in the rams which is supplied by the lower pack 21 is proportional to the urging force between the headframe 1 and the ramp pan 2. In effect, a function of the rams 17 and 18 is as sensing means. This hydrualic pressure is monitored by the monitor 29 and transmitted to the monitor 34' in the computer means, which is thereby kept aware of the conveyor performance. The travel of the ram pistons 19 and 20 takes up relative movement of the head frame 1 and ramp pan 2. The pressure equaliser 27 ensures that the urging force is evenly distributed between the rams 17 and 18.

Now suppose that the conveyor chain breaks, then either or both of the following things will happen; the switch 31 will be actuated because the supply line pressure falls below the preselected value, or one or both of the switches 37 and 38 will be actuated because the pistons 19 and 20 are fully extended. Consequently if the chain breaks the conveyor motor 4 will be switched off and the computer means notified of chain breakage. Consequently, chain cannot pile up under the conveyor to cause serious repair problems.

Alternatively suppose that the tension in the conveyor chain is too high. In this situation either or both of the following things will happen; the relief valve 30 will be actuated relieving the power pack pressure to tank, or the further switches 41 and 42 will be actuated. Consequently, the hydraulic circuit is not damaged and the computer means is notified of the excess tension by the switches 41 and 42 or the relief valve 30 so that the computer means 34 can give warning thereof.

In both of the above mentioned situations the monitor 29 will travel outside its normal operating range so that the computer is separately notified via line 32 and monitor 34' of dangerous chain breakages and pressures, since the computer means 34 is programmed to recognise when the signal received in the monitor 34' from the monitor 29 is outside its normal range.

The function of the manual control valve 26 is to enable operators to retract the rams 17 and 18 for purposes such as overhaul or adjustment. It can be seen that the valve 26 is the sort which causes a changeover of direction of hydraulic fluid between the two lines to which it is connected.

The invention is not limited to armoured face conveyors and on other conveyors the rams 17 and 18 may be positioned other than on the headframe e.g. or adjacent conveyor pans.

From the above description it can be seen that the present invention provides an improved conveyor arrangement which tends to operate more efficiently than hitherto.

We claim:

1. A conveyor arrangement comprising a drive motor, at least one tensioned endless component driven by said drive motor, two conveyor parts which, in use, are urged towards each other under the action of the tensioned endless component, hydraulic ram means operable to urge said two conveyor parts apart to maintain said endless component tensioned, sensing means for sensing the hydraulic pressure in the hydraulic ram means and for deriving signals indicative of the sensed hydraulic pressure, and control means responsive to said derived signals for controlling operation of said drive motor, said control means comprising a computer means including a monitor for monitoring the signals derived by the sensing means.

2. A conveyor arrangement as in claim 1, in which said sensing means derives a first signal if the sensed hydraulic pressure falls below a preselected value.

3. A conveyor arrangement as in claim 2, in which said sensing means derives a further signal if the sensed hydraulic pressure exceeds a further preselected value.

4. A conveyor arrangement as in claim 2, in which said sensing means is sensitive to extension of the hydraulic ram means, the sensing means deriving a further signal if the ram extension exceeds a preselected value.

5. A conveyor arrangement as in claim 4, in which the first signal and the further signal actuate the computer means to switch off the drive motor.

6. A conveyor arrangement as in claim 1, in which the monitor notifies the computer means if the derived signals fall outside their normal operating range.

7. A conveyor arrangement as in claim 6, in which the computer means derives a warning signal if the signals indicative of the sensed hydraulic pressure are above a preselected value.

* * * * *